T. G. YEOMANS.
Grape-Vine Trellis.
No. 84,154. Patented Nov. 17, 1868.
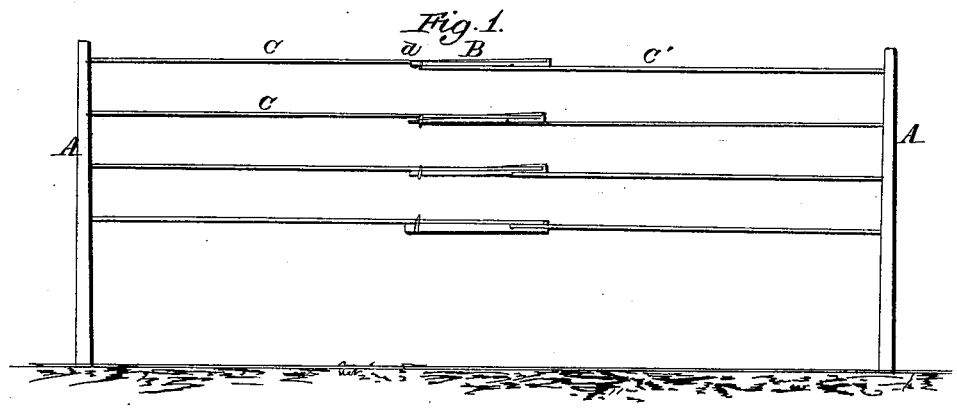
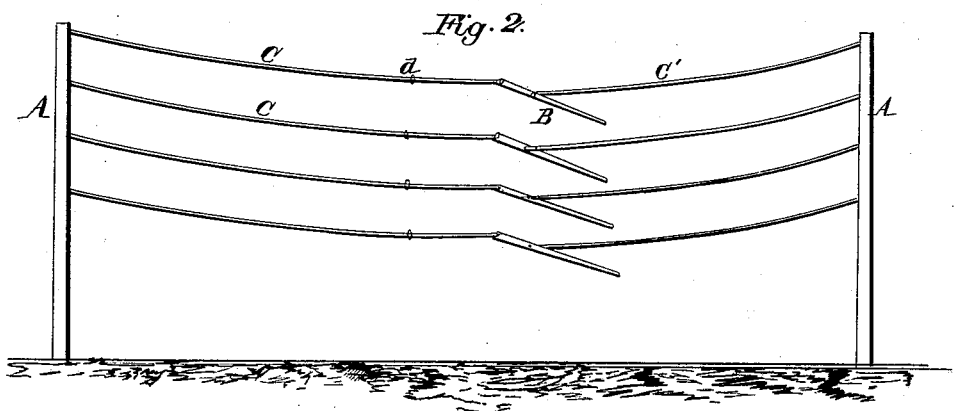

T. G. YEOMANS, OF WALWORTH, NEW YORK.

Letters Patent No. 84,154, dated November 17, 1868.

IMPROVEMENT IN GRAPE AND VINE-TRELLIS.

The Schedule referred to in these Letters Patent and making part of the same.

*To all whom it may concern:*

Be it known that I, T. G. YEOMANS, of Walworth, in the county of Wayne, and State of New York, have invented a new and useful Improvement in Grape-Vine Trellis; and I do hereby declare that the following is a full, clear, and exact description thereof, which will enable those skilled in the art to make and use the same, reference being had to the accompanying drawings, forming part of this specification, in which—

Figure 1 is a side view of my invention, showing the position of the parts when the wires are tightened, and Figure 2 is a like view, showing the wires when slackened.

Similar letters of reference indicate like parts.

In using wire for the bars of trellises, it is necessary to slacken them when not in use, during the winter-season, or, owing to the contraction of the wires by cold, undue strain is brought upon them, and they are liable to be broken, and the supporting-posts are also pulled out of position by the additional strain, and by the softening of the ground at the latter part of winter.

This invention consists in attaching to each of the wire bars a short hand-lever, so that the bars are tightened or slackened with the greatest facility, and in a very simple and inexpensive manner, as hereinafter more fully explained.

In the accompanying drawings, A A are the supports or posts, and C C' are the wire bars. B are the tightening-levers.

In applying the levers, I cut each bar at its centre, and connect the two parts of the bar or wire by the lever B, the part C being fastened to the working end of the lever, while the part C' is fastened near the centre of the lever, and acts as the fulcrum of the lever. To tighten the bars, the handle of the lever is carried up in line with bar C, as shown in fig. 1, and secured by a ring, *d*, which slides on the bar C. The released position of the tightening-levers is shown by fig. 2.

These levers B are about two feet or eighteen inches in length, with the fulcrum at about four inches from the working end, and are made of wood. With the fulcrum at about four inches from the end of the lever, its tightening-throw or capacity is about eight inches.

The cost for this straining or tightening-device is but a trifle, as the ends of the wires are attached to a lever by holes in the lever, and twisting in the ends of the wires, and the locking-rings *d*, when made of malleable cast-iron, weigh about twenty to the pound, but these rings may be made of wire readily, and the whole can be constructed by ordinary farm-labor.

The device has been designed especially for grape-vine trellises, but is equally suited for hop-trellises, and for trellis-purposes generally. The levers B may be made to work on the posts A, but I consider this method as preferable.

I am aware of the patent granted to C. Seyler, dated June 2, 1868, for a trellis, in which the wires are tightened by being wound around a vertical drum; but this I do not claim, as it forms no part of my invention.

Having thus described my invention,

What I claim as new, and desire to secure by Letters Patent, is—

The combination, with the independent wires C C', of the lever B, having openings at different points, whereby said wires are connected thereto, and thereby tightened, and a sliding ring, *d*, for holding the wires when so tightened, substantially as described.

The above specification of my invention signed by me, this 22d day of August, 1868.

T. G. YEOMANS.

Witnesses:
 WM. J. DODGE,
 T. A. MORLEY.